US006582166B1

(12) United States Patent
Strobel et al.

(10) Patent No.: US 6,582,166 B1
(45) Date of Patent: Jun. 24, 2003

(54) METHOD OF COMPENSATING FOR CUTTER DEFLECTION

(75) Inventors: Wolfgang M. Strobel, Tolland, CT (US); Robert J. Lockhart, Deep River, CT (US)

(73) Assignee: Gerber Scientific Products, Inc., Manchester, CT (US)

(*) Notice: Subject to any disclaimer, the term of this patent is extended or adjusted under 35 U.S.C. 154(b) by 0 days.

(21) Appl. No.: 09/425,505

(22) Filed: Oct. 22, 1999

(51) Int. Cl.$^7$ .................................................. B23C 1/00
(52) U.S. Cl. ........................... 409/132; 409/186; 83/56; 700/193
(58) Field of Search ................................ 83/76.1, 76.6, 83/76.9, 74, 56, 875, 940, 941; 409/132, 131, 80, 193, 186–190, 191; 700/167, 193

(56) References Cited

U.S. PATENT DOCUMENTS

| | | | |
|---|---|---|---|
| 2,914,100 A | 11/1959 | Lindholm | 143/160 |
| 3,190,159 A | 6/1965 | Wilkie | 83/56 |
| 3,270,186 A | * 8/1966 | Centner | 409/80 |
| 3,350,966 A | * 11/1967 | Moulton | 409/80 |
| 3,605,531 A | * 9/1971 | Izumi et al. | 409/80 |
| 3,886,846 A | * 6/1975 | Bodine | 409/132 |
| 4,035,706 A | * 7/1977 | Cutler | 700/193 |
| 4,091,698 A | 5/1978 | Obear | 83/34 |
| 4,133,234 A | * 1/1979 | Gerber | 83/56 |
| 4,133,235 A | 1/1979 | Gerber | 83/74 |
| 4,140,037 A | 2/1979 | Gerber | 83/56 |
| 4,178,820 A | * 12/1979 | Gerber | 83/56 |
| 4,200,015 A | 4/1980 | Gerber | 83/22 |
| RE30,757 E | 10/1981 | Gerber | 83/74 |
| 4,299,061 A | 11/1981 | Parnum | 51/101 |
| 4,327,615 A | * 5/1982 | Gerber et al. | 83/56 |
| 4,331,051 A | 5/1982 | Gerber | 83/74 |
| 4,380,944 A | 4/1983 | Gerber | 83/49 |
| 4,402,161 A | 9/1983 | Price et al. | |
| 4,436,013 A | 3/1984 | Gerber | 83/747 |
| 4,437,367 A | 3/1984 | Hauser | 83/13 |
| 4,449,699 A | 5/1984 | Ashizawa | 266/58 |
| 4,456,962 A | 6/1984 | Imazeki | 364/520 |
| 4,478,120 A | 10/1984 | Sugimoto | 83/71 |

(List continued on next page.)

FOREIGN PATENT DOCUMENTS

| | | |
|---|---|---|
| EP | 0 487 738 A1 | 6/1992 |
| JP | 3241119 | 10/2001 |

Primary Examiner—Allan N. Shoap
Assistant Examiner—Stephen Choi
(74) Attorney, Agent, or Firm—McCormick, Paulding & Huber LLP

(57) ABSTRACT

A method of cutting planar material with a controlled cutting machine having a cutting tool with a tool tip includes performing a cutting test on various planar materials with the cutting machine under selected cutting conditions which produce deflection forces on the cutting tool due to the interaction of the cutting tool and materials so as to cause the tool tip to offset and move along deviated or offset cutting paths relative to desired cutting paths, and determining compensating offsets in order to align and coincide the actual cutting paths with the desired cutting paths A schedule of the compensating offsets to align and coincide the actual cutting paths with the desired cutting paths is established as determined by the cutting tests. The schedule is to be repeatedly used thereafter for cutting planar material having cutting conditions associated with the schedule. Planar material is cut thereafter along desired cutting paths by advancing the cutting tool and planar material relative to one another and employing the schedule of compensating offsets to control the actual cutting paths to align and coincide with the desired cutting paths when desired cutting paths and corresponding cutting conditions arise.

1 Claim, 3 Drawing Sheets

U.S. PATENT DOCUMENTS

| | | | |
|---|---|---|---|
| 4,495,561 A | 1/1985 | Matsuura et al. | |
| 4,524,894 A | 6/1985 | Leblond | 225/2 |
| 4,603,285 A | 7/1986 | Matsuura et al. | 318/578 |
| 4,606,489 A | 8/1986 | Steinhart et al. | |
| 4,620,465 A | 11/1986 | Taguchi | 83/74 |
| 4,659,265 A * | 4/1987 | Kishi et al. | 409/132 |
| 4,674,928 A * | 6/1987 | Lyman | 409/80 |
| 4,879,935 A | 11/1989 | Gerber | 83/748 |
| 4,924,727 A | 5/1990 | Pearl | 74/603 |
| 5,033,343 A | 7/1991 | Gerber | 83/74 |
| 5,053,973 A * | 10/1991 | Fujii et al. | 700/193 |
| 5,062,332 A | 11/1991 | Blaimschein | 83/74 |
| 5,067,378 A | 11/1991 | Gerber | 83/13 |
| 5,095,793 A | 3/1992 | Button | 83/628 |
| 5,099,731 A | 3/1992 | Eigenmann | 83/74 |
| 5,210,697 A * | 5/1993 | Kawanabe | 700/193 |
| 5,255,201 A * | 10/1993 | Maeda | 700/193 |
| 5,261,768 A * | 11/1993 | Loucks et al. | 409/132 |
| 5,374,884 A * | 12/1994 | Koren et al. | 700/193 |
| 5,387,061 A * | 2/1995 | Barkman et al. | 409/80 |
| 5,479,353 A * | 12/1995 | Nakamura | 700/193 |
| 5,492,440 A * | 2/1996 | Spaan et al. | 700/193 |
| 5,521,480 A | 5/1996 | Yeo | 318/626 |
| 5,521,829 A | 5/1996 | Jeon | 364/474.03 |
| 5,631,851 A | 5/1997 | Tanaka et al. | |
| 5,727,433 A | 3/1998 | Pomerleau et al. | 83/29 |
| 5,806,390 A | 9/1998 | Pomerleau et al. | 83/29 |
| 5,890,524 A * | 4/1999 | Tucker et al. | 83/468.7 |

* cited by examiner

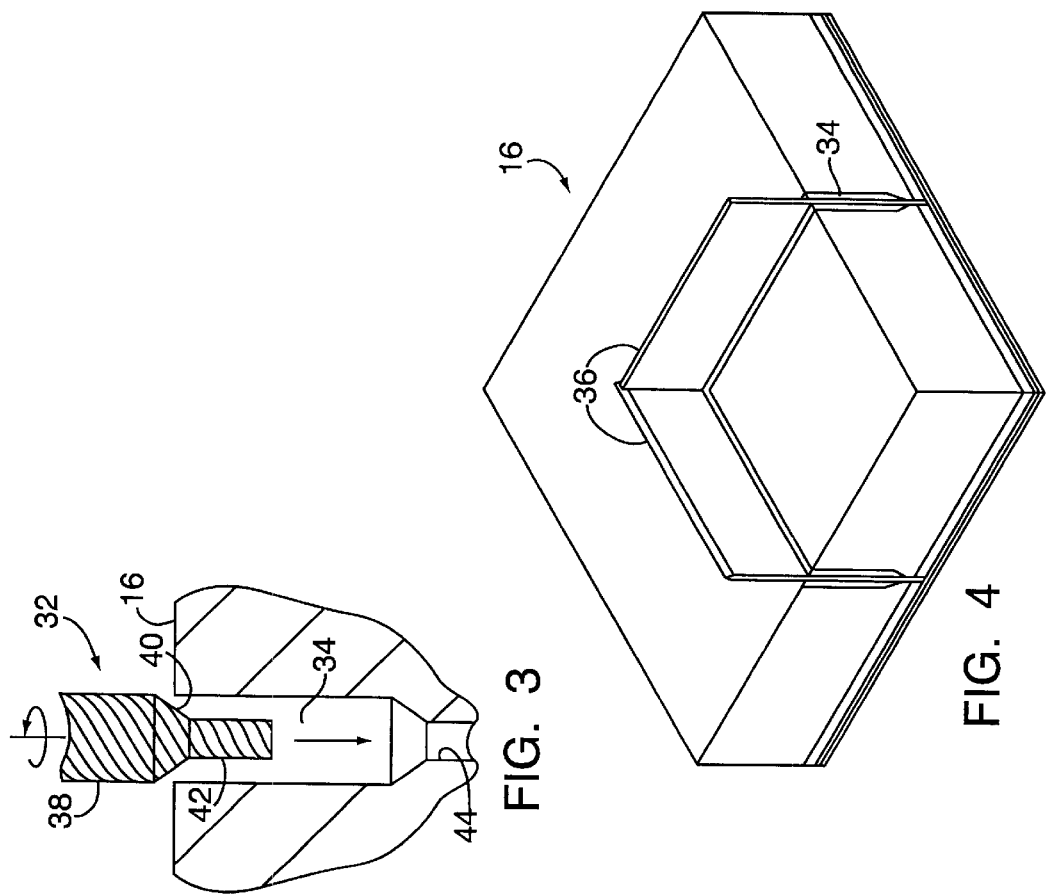
FIG. 3
FIG. 4
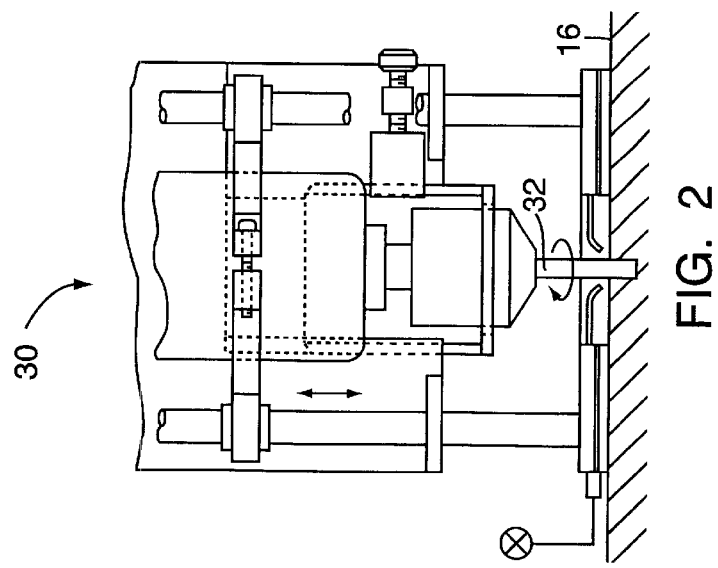
FIG. 2

METHOD OF COMPENSATING FOR CUTTER DEFLECTION

FIELD OF THE INVENTION

The present invention relates generally to a method of cutting planar material, and more particularly to a method of providing offset compensation to a cutting blade to counter deviation and offset of the cutting path resulting from deflection forces exerted on the blade tip.

BACKGROUND OF THE INVENTION

The cutting of planar material or sheet material with a cutting device is typically subject to deviations between the desired cutting path and the actual cutting path because of deflection forces exerted on the cutting tool. For example, U.S. Pat. No. 4,140,037, owned by the assignee of the present invention, provides yaw to a reciprocating cutting blade when cutting limp sheet material such as fabric in order to reduce deflection forces and thereby align the actual cutting path with the desired cutting path.

Cutting tools when cutting through rigid planar material such as natural wood or plywood are susceptible to relatively high deflection forces compared to tools cutting through limp sheet material. Cutting path precision is especially critical when cutting slots in rigid planar material such as die boards. Die boards are generally used to cut and/or crease one or more layers of sheet-type work material, such as cardboard, for use in the manufacture of various different articles. One such use, for example, is the fabrication of box and package blanks which after having been cut or creased by the die board, may be folded into finished boxes or product packages.

Usually, the die board consists of a base made from a thick piece of material such as plywood, that has a series of slots cut into it. These slots are arranged in a pattern corresponding, for example, to the outer periphery of a box or package blank, and the lines along which the blank must be folded to create the finished box or package. Rules, which generally consist of pieces of steel cut to lengths and/or bent to correspond to the slot length and configurations in the base, are then inserted into and protrude from the slots. The amount by which a particular rule extends from the slot depends on whether the rule will be employed to cut or crease the sheet material. Generally, during a cutting or creasing operation, the sheet material is positioned under the die board and pressure is applied to the board via a press, causing the rules to engage the sheet material, thereby cutting and creasing the sheet material.

In known methods of fabricating die boards, difficulties are often associated with the formation of the slots that must be cut into the die board base to accommodate the rules. Typically these slots are cut into the base in one of two ways; (1) using lasers, or (2) using a jig or band saw. The capital cost of a laser is generally very high, and the use of lasers tends to be expensive and complex. Further, a large amount of power is required to operate the laser, and the laser beam typically must be shielded using an inert gas. Another difficulty associated with using lasers is that the slots produced tend to have scalloped edges. When the rules are inserted into these slots, rather than having line contact between the slot edges and the rules, the rules engage the slot edges at discrete points corresponding to the "peaks" of the scalloped edge. This reduces the stability of the rule in the die-board so as to increase the potential for inaccurate cutting and creasing when the die board is used. This problem is further exacerbated because the heat associated with the laser tends to dry out the board resulting in dimensional distortion of the slots being cut and warping of the board. A further problem also attributable to the heat of the laser is that smoke is generated from the material being cut. The smoke causes environmental problems which must be addressed, resulting in further increases in operating expense.

When a jig or band saw is employed, a starting hole must be drilled at one end of the slot to facilitate insertion of the blade associated with the saw. This requires an additional operation, thereby adding to the cost associated with fabricating the die board. Furthermore, these slots are often cut by hand with the inaccuracies resulting from human error making it difficult to insert the die board rules into the slots. The potential human error can also result in inaccurate die cutting. In addition, when using a manual process, the cut lines must be transferred by hand onto the die board.

It has been discovered that rotary cutting tools are preferable over lasers, jig saw reciprocating blades and band saw blades for cutting slots in die boards. The rotary cutting blade, which for example is in the form of a drill, makes a smooth groove and lends to accurate material removal when cutting through the die board base. Further, rotary machining is an efficient method of toolmaking and is fundamentally more precise than hand work or the burning process of a laser. As set forth in U.S. application Ser. No. 09/271,416, filed Mar. 17,1999 and owned by the assignee of the present invention, the rotary machining process employs a uniquely-shaped conical cutting tool which rotates at exceptionally high speeds to cut precise linear slots into plywood base materials. Steel rules are then inserted into these slots for cutting and creasing cartons. A drawback with employing rotary drills is that a deflection force opposing blade motion and rotation causes the tool tip to bend or deflect relative to the upper portion of the tool resulting in the deviation or offset of the actual cutting path relative to the desired cutting path. The deviation becomes more pronounced as the tool tip decreases in diameter.

In view of the foregoing, it is an object of the present invention to provide a cutting method which overcomes the above-mentioned drawbacks and disadvantages associated with deviations between the desired cutting path and the actual cutting path when performing a cutting operation on planar material.

SUMMARY OF THE INVENTION

A method of cutting planar material with a controlled cutting machine having a cutting tool includes performing a cutting test on various planar materials with the cutting machine under selected cutting conditions which produce deflection forces on the cutting tool tip due to the interaction of the blade and materials so as to cause the cutting tool tip to offset and move along deviated or offset cutting paths relative to desired cutting paths, and determining compensating offsets in order to align and coincide the actual cutting paths with the desired cutting paths. A schedule of the compensating offsets to align and coincide the actual cutting paths with the desired cutting paths is established as determined by the cutting tests. The schedule is to be repeatedly used thereafter for cutting planar material having cutting conditions associated with the schedule. Planar material is cut thereafter along desired cutting paths by advancing the cutting tool and planar material relative to one another and employing the schedule of compensating offsets to control the actual cutting paths to align and coincide with the desired cutting paths when desired cutting paths and corresponding cutting conditions arise.

An advantage of the present invention is that deviations or offsets to the cutting path because of deflection forces imposed on the cutting tool tip are reduced or eliminated without the need for the cutting apparatus to rely on complex and expensive feedback control during the cutting operation.

Other advantages will be made apparent with reference to the specification and accompanying drawings.

BRIEF DESCRIPTION OF THE DRAWINGS

FIG. 2 is a flat bed router used in the cutter apparatus of FIG. 1.

FIG. 3 is a dieboard base showing steel rules inserted in grooves formed by the cutting technique of the present invention.

FIG. 4 is a partial, sectional, side elevational view of a groove formed in a dieboard in accordance with the present invention.

DETAILED DESCRIPTION OF THE PREFERRED EMBODIMENT

Figure 1:
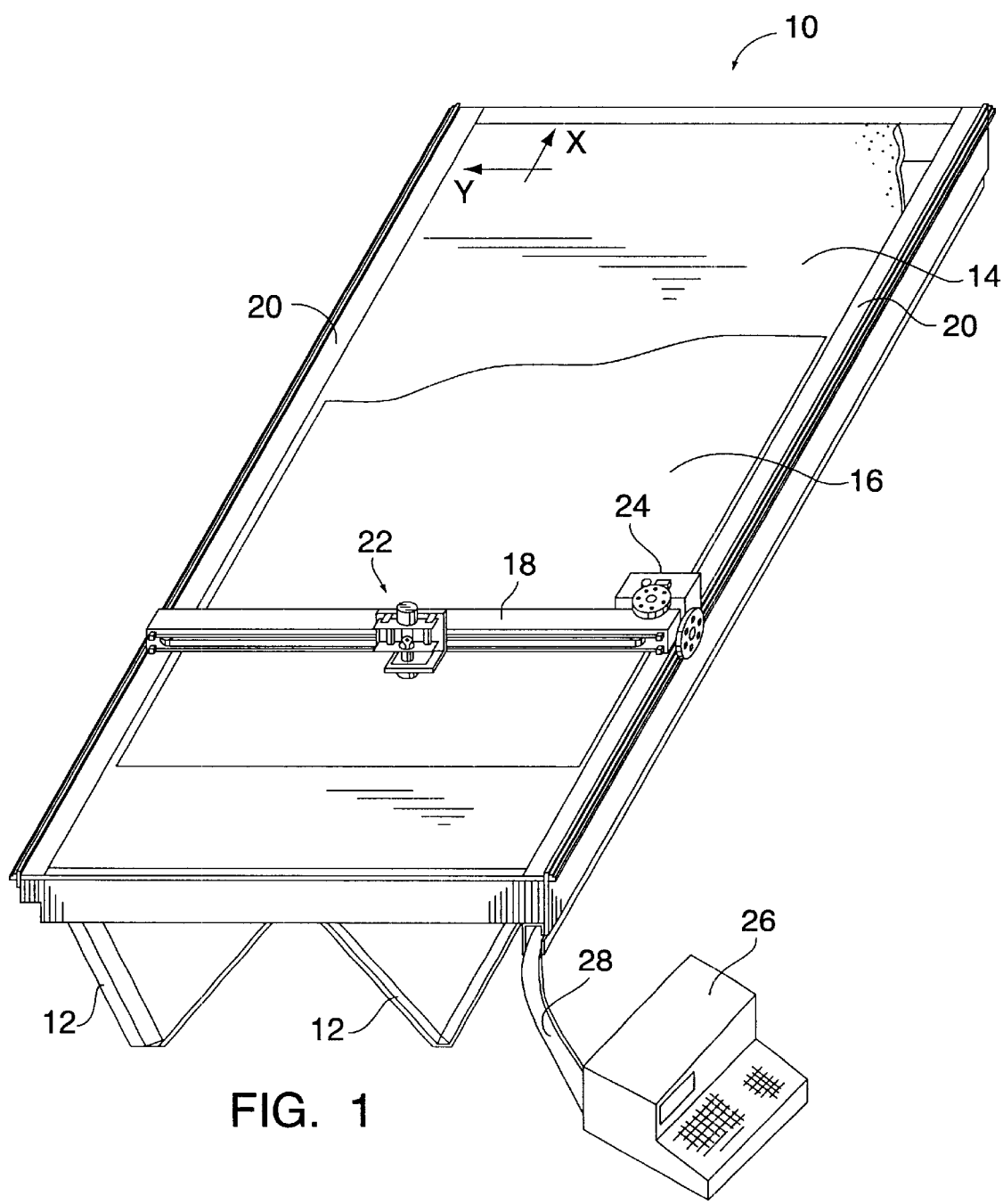
FIG. 1 schematically illustrates a cutter apparatus for employing directional compensation to a cutting blade in accordance with the present invention.

With reference to FIG. 1, an example of a cutting apparatus for employing a directional compensation technique in accordance with the present invention is indicated generally by the reference number 10. The cutting apparatus 10 is merely shown in an illustrative sense and not in a limiting sense for performing directional compensation in accordance with the present invention.

The cutting apparatus 10 supported on legs 12, 12 includes a work support surface 14 for supporting a workpiece 16, such as a dieboard base. A carriage 18, for movement in an x-axis direction, extends transversely to the length of the apparatus 10 and is controllably movably supported at each longitudinal end by rails 20, 20 disposed on each side and extending along the length of the apparatus. A cutter assembly 22 is controllably movably supported on the carriage 18 for movement along the length of the carriage in a y-axis direction. A motor box 24 includes x and y axis motors for respectively moving the carriage 18 along the rails 20, 20, and for moving the cutter assembly 22 along a length of the carriage. A controller 26, such as a programmable personal computer, is electrically coupled via cable 28 or other practical mode of communication to the motors housed in the motor box 24 for controlling the movement of the carriage 18 and the cutter assembly 22 mounted thereon.

With reference to FIGS. 2 and 3, the cutter assembly 22 may be, for example, a rotary cutting tool such as a router head 30 which rotatably supports a router bit 32 engaging the workpiece 16 to cut grooves therein. As shown in FIG. 4, the workpiece 16 may be, for example, a dieboard base having grooves or dieboard kerfs 34 cut therein. The grooves 34 frictionally engage steel rules 36 used for cutting or creasing carton blanks (not shown) which are thereafter assembled into packages.

With reference to FIG. 3, the router bit 32 is preferably tapered along a portion of its length so that the support or upper end of the bit is wider in diameter relative to the cutting or lower end of the bit. More specifically, the router bit 32 includes an upper, relatively wide diameter portion 38, a tapered middle portion 40 and a lower, relatively narrow diameter portion 42. The relatively wide diameter or upper portion 38 of the bit 32 gives the bit strength, durability and a long operating life to penetrate downwardly into and cut along the dieboard base 16. The relatively narrow diameter or lower portion 42 enables the bit 32 to cut a fine and precise groove or kerf 34 along the dieboard base 16. Because the lower portion 42 is of a generally constant diameter, the bit 32 cuts a groove 34 having a lower portion 44 with a substantial surface area for engaging and securing the associated steel rule 36 inserted in the groove relative to conventional grooves which have a relatively small engagement surface area.

Figure 5:
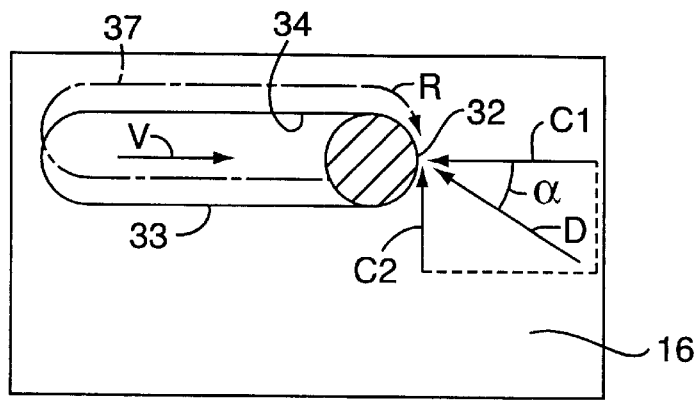
FIG. 5 is a sectional, top plan view of a rotary cutting tool forming a groove, and illustrating deflection forces imposed on the rotary cutting tool tip.

FIG. 5 schematically illustrates in top plan view a bit 32 forming a groove 34 as it moves in the direction labeled by the arrow V. An opposing or deflection force represented by the arrow D is exerted on the bit 32 by the dieboard base 16. The deflection force D includes a first component force represented by the arrow C1 which is a force opposing the linear movement of the bit along the straight line direction shown by the arrow V. The deflection force also includes a second component force represented by the arrow C2 which is a force opposing the rotational movement of the bit in the rotational direction shown by the arrow R. The deflection force D which the dieboard base 16 exerts on the bit tip when uncompensated tends to deflect the bit tip relative to the upper portion 38 of the bit due to the interaction of the bit tip and materials so as to cause the bit tip to move along an offset cutting path 37 relative to the desired cutting path 33 shown in FIG. 5.

The amount of offset between the actual cutting path and the desired cutting path caused by such deflection forces is a function of a number of factors including the material of the workpiece being cut, the diameter of the cutting bit tip, the velocity of the bit including acceleration and deceleration of the bit along the cutting path, and the depth of the cut.

Figure 6:
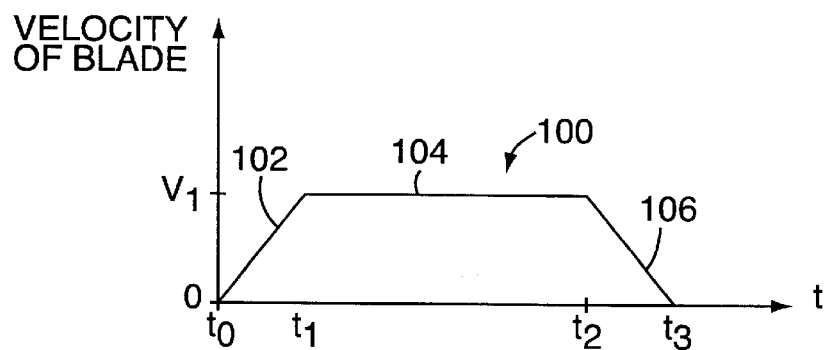
FIG. 6 is a graph illustrating a velocity profile over time of a cutting tool as it forms a groove.

With reference to FIG. 6, an end user or other programmer of the apparatus 10 may input into the controller 26 of the cutting apparatus 10 (see FIG. 1) a velocity profile 100 of a groove cutting operation for forming, for example, a straight line groove along a workpiece such as a kerf formed along a dieboard base. The velocity profile 100 includes a ramp-up portion 102 during an initial time period where the cutting tool increases in velocity (i.e., accelerates) from zero at time $t_0$ to a maximum velocity $V_1$ at time $t_1$ to begin cutting the groove. The velocity profile 100 further includes a level-off portion 104 during a middle time period where the cutting tool maintains the maximum velocity V1 from time $t_1$ to time $t_2$. The velocity profile 100 also includes a ramp-down portion 106 during a final time period where the cutting tool decreases in velocity (i.e., decelerates) from the maximum velocity $V_1$ at time $t_2$ to a velocity of zero at time $t_3$ to finish cutting the groove. The velocity profile is then executed as a cutting test in order to measure and store in memory in the controller 26 a deflection offset profile as the cutting tool forms a groove in the workpiece.

Preferably, however, the programmer or end user need only perform benchmark tests to measure and input into the controller offsets of the cutting tool tip for one or a few velocities of the cutting blade for various parameters such as the material of the workpiece being cut, the diameter of the cutting bit tip, and the depth of the cut. Thus, the tests need be performed only once for each set of parameters. Because the degree of offset is generally proportional to the velocity of the cutting tool, once a benchmark test is performed for each set of parameters, the controller can then later execute a velocity profile to be performed in a formal cutting operation for that set of parameters, and the controller will automatically calculate the degree of deflection of the cutting tool tip for the velocity profile based on the benchmark test based on the associated parameters.

Figure 7:
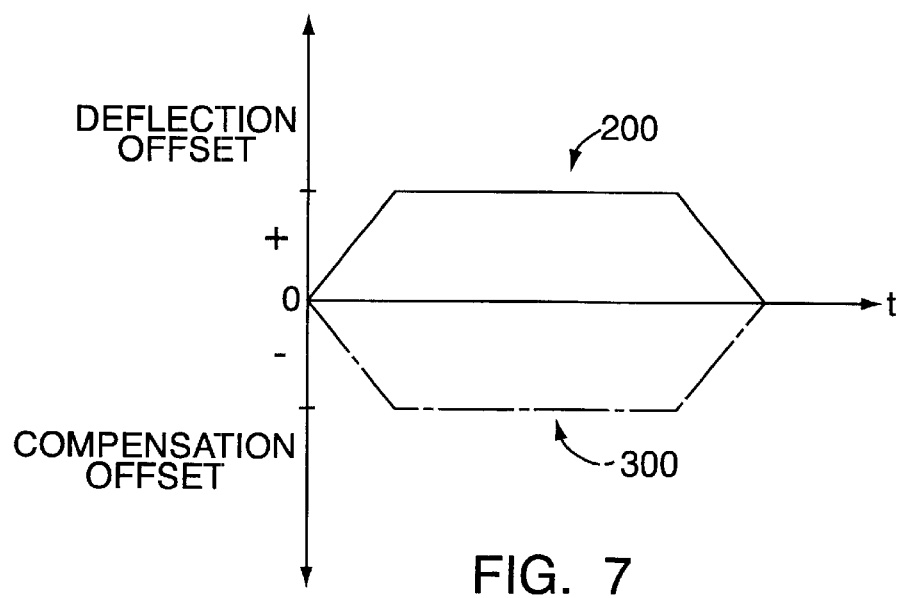
FIG. 7 is a graph illustrating a deflection offset imposed by a cutting tool over time and a corresponding compensation offset directing the cutting tool in accordance with the present invention.

FIG. 7 schematically illustrates by way of example such a deflection offset profile 200 corresponding to the velocity profile 100 of FIG. 6. The deflection offset profile 200 is defined as the offset distance between the desired cutting path 33 as shown in FIG. 5 and the actual cutting path 37 which is part a function of cutting tool velocity. As the deflection offset increases as the cutting tool moves along the workpiece with increasing velocity, the actual cutting path of an uncompensated cutting tool tip tends to increasingly deflect or offset from the desired straight line cutting path per unit of length traversed by the cutting tool along the workpiece.

FIG. 7 also schematically illustrates a compensation offset profile 300 in accordance with the present invention, corresponding to the deflection offset profile 200. The compensation offset profile 300 is defined as the offset distance between a compensation cutting path applied to the cutting tool by the apparatus 10 and the desired cutting path. The compensation offset profile 300 is generated by the controller 26 as a function of the deflection offset profile previously input into the controller by the end user or programmer. As can be seen in FIG. 7, the compensation offset profile 300 is preferably a mirror image of the deflection offset profile 200 in order that the deflection offsets and the corresponding compensation offsets cancel one another so that the actual cutting path is generally the same as the desired cutting path. In other words, the cutting tool is moved by the controller 26 along a path that is offset from the desired cutting path in an offset direction opposite to an offset direction otherwise caused by deflection forces exerted on the cutting tool tip to thereby compensate for such deflection forces and align and coincide the actual cutting path with the desired cutting path generally along each point of the cutting path.

Because "test runs" can be performed by a programmer or end user to determine and store compensation information before formal cutting operations are performed, the method of the present invention eliminates the need for a cutting apparatus to include complex and expensive feedback components to measure and perform compensation "on the fly" during a cutting operation.

Although this invention has been shown and described with respect to exemplary embodiments thereof, it should be understood by those skilled in the art that the foregoing and various other changes, omissions, and additions in the form and detail thereof may be made therein without departing from the spirit and scope of the invention. Accordingly, the present invention has been shown and described by way of illustration rather than limitation.

What is claimed is:

1. A method of cutting planar production material with a controlled cutting machine having a cutting tool with a tool tip and which machine moves the tool in response to control data defining commanded cutting paths, said method comprising the steps of:

performing cutting tests on various planar test materials with the cutting machine under selected cutting conditions using test control data defining commanded test cutting paths whereby deflection forces are produced on the tool due to the interaction of the tool and materials so as to cause the tool tip to move along actual test cutting paths laterally offset from the commanded test cutting paths, and determining compensating lateral directional offsets needed to align the actual test cutting paths with the commended test cutting paths;

establishing a schedule of the compensating lateral directional offsets needed to align the actual test cutting paths with the commanded test cutting paths as determined by the cutting tests, the schedule to be repeatedly used thereafter for cutting planar production material having cutting conditions associated with the schedule; and cutting planar production material thereafter by advancing the cutting tool and planar material relative to one another with said machine operating in response to production control data defining commanded production cutting paths and using said schedule of compensating lateral directional offsets to modify the production control data to cause the paths followed by the cutting tool to be said commanded production cutting paths, wherein the cutting conditions include a ramp-up speed profile of the cutting tool, a level-off speed of the cutting tool, a ramp-down speed profile of the cutting tool, depth of the cutting tool cut through the planar material, the material of the cutting tool, dimensions of the cutting tool, and material of the planar material, wherein the cutting tool is a rotary cutting tool, and wherein the cutting conditions further include the rotating speed of the cutting tool, and the number of flutes of the cutting tool.

\* \* \* \* \*